United States Patent
Takei et al.

(10) Patent No.: US 9,296,070 B2
(45) Date of Patent: Mar. 29, 2016

(54) METHOD OF MANUFACTURING HEAD SUSPENSION HAVING LOAD BEAM AND FLEXURE ALIGNED WITH LOAD BEAM AND REFERENCE PIN BLOCK USED FOR THE METHOD

(71) Applicant: NHK SPRING CO., LTD, Yokohama-shi, Kanagawa (JP)

(72) Inventors: Akihiro Takei, Kanagawa (JP); Naoki Tanaka, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 617 days.

(21) Appl. No.: 13/654,759

(22) Filed: Oct. 18, 2012

(65) Prior Publication Data

US 2013/0098885 A1  Apr. 25, 2013

(30) Foreign Application Priority Data

Oct. 24, 2011  (JP) ................. 2011-233321

(51) Int. Cl.
  *B23K 26/00* (2014.01)
  *G11B 5/48* (2006.01)
  *B23K 26/22* (2006.01)
(52) U.S. Cl.
  CPC .............. *B23K 26/22* (2013.01); *G11B 5/4826* (2013.01); *B23K 2201/36* (2013.01)
(58) Field of Classification Search
  CPC .............. B23K 2201/36; B23K 26/22; G11B 5/48–5/4826
  USPC .............. 219/121.64–121.73; 360/245–245.5
  See application file for complete search history.

(56) References Cited

U.S. PATENT DOCUMENTS

| | | | |
|---|---|---|---|
| 5,201,458 A | 4/1993 | Hagen | |
| 5,526,205 A | 6/1996 | Aoyagi et al. | |
| 5,570,249 A | 10/1996 | Aoyagi et al. | |
| 6,055,133 A * | 4/2000 | Albrecht et al. | 360/245.2 |
| 6,144,531 A * | 11/2000 | Sawai | 360/245.1 |
| 6,313,971 B1 * | 11/2001 | Takagi et al. | 360/245.2 |
| 6,466,412 B1 | 10/2002 | Adams et al. | |
| 6,657,821 B1 * | 12/2003 | Jenneke | 360/245.2 |
| 6,704,163 B1 | 3/2004 | Detjens et al. | |
| 6,741,425 B1 * | 5/2004 | Wu et al. | 360/245.1 |
| 6,965,501 B1 | 11/2005 | Pan et al. | |
| 7,315,435 B1 | 1/2008 | Pan | |
| 2002/0051320 A1 | 5/2002 | Takagi et al. | |
| 2002/0051321 A1 | 5/2002 | Takagi et al. | |
| 2003/0107844 A1 | 6/2003 | Okamoto et al. | |
| 2006/0215325 A1 | 9/2006 | Motonishi et al. | |

FOREIGN PATENT DOCUMENTS

| | | |
|---|---|---|
| JP | 8-87846 | 4/1996 |
| JP | 11-110924 | 4/1999 |

(Continued)

*Primary Examiner* — Sang Y Paik
(74) *Attorney, Agent, or Firm* — Jordan and Hamburg LLP

(57) ABSTRACT

A method manufactures a head suspension by laser-welding the flexure to the load beam at a first welding spot so that a tongue is pressed against a convex portion under predetermined load. The method includes step of forming, before joining the flexure and load beam together, at least one positioning reference hole in each of the flexure and load beam within a circular range that is defined around the first welding spot with a radius equal to a distance between the first welding spot and the projection, laying the flexure and load beam one on another, inserting reference pin into the reference holes, and laser-welding the flexure and load beam to each other at the first welding spot.

11 Claims, 6 Drawing Sheets

(56) References Cited

FOREIGN PATENT DOCUMENTS

| | | |
|---|---|---|
| JP | 2000-163904 | 6/2000 |
| JP | 2002-133808 | 5/2002 |
| JP | 2002-133813 | 5/2002 |
| JP | 2003-173642 | 6/2003 |
| JP | 2006-269018 | 10/2006 |

* cited by examiner

FIG.13

| σ | RY | RX |
|---|---|---|
| Related art | 0.0031 | 0.0042 |
| Two pins | 0.0029 | 0.0029 |
| Four pins | 0.0022 | 0.0011 |

Unit : mm

US 9,296,070 B2

METHOD OF MANUFACTURING HEAD SUSPENSION HAVING LOAD BEAM AND FLEXURE ALIGNED WITH LOAD BEAM AND REFERENCE PIN BLOCK USED FOR THE METHOD

BACKGROUND OF THE INVENTION

1. Field of the Invention

The present invention relates to a method of manufacturing a head suspension having a load beam and a flexure aligned with the load beam and a reference pin block used for the method. The head suspension is a device that is installed in a hard disk drive of an information-processing device such as a computer.

2. Description of Related Art

A head suspension includes a load beam and a flexure attached to a rigid part of the load beam. The flexure and rigid part are provided with reference holes into which reference pins of a jig are inserted to position the flexure and rigid part with respect to each other. In the positioned state, the flexure and rigid part are joined together by, for example, laser welding so that the flexure is kept fixed and aligned to the load beam.

Japanese Unexamined Patent Application Publication No. 2000-163904 discloses a technique of forming a reference hole in a flexure and a burring hole in a load beam. Along an inner circumferential edge of the burring hole, a flange is formed. The flexure is laid on the load beam and the flange of the load beam is fitted into the reference hole of the flexure, to position the load beam and flexure relative to each other.

This related art carries out zero-clearance positioning to correctly align the load beam and flexure to each other.

Another related art disclosed in Japanese Unexamined Patent Application Publication No. 2002-133803 forms two reference holes in a load beam and a frame which is outside the load beam, to secure a relatively long distance between the reference holes.

The related arts mentioned above, however, have a limitation in the alignment correctness. In particular, the related arts are improper to carry out high-precision positioning on recent head suspensions that employ very-thin flexures because such very-thin flexures are very low in rigidity.

SUMMARY OF THE INVENTION

An object of the present invention is to provide a method of manufacturing a head suspension, capable of advancing an alignment correctness between a flexure and a load beam and another object thereof is to provide a reference pin block used for the method.

In order to accomplish the objects, an aspect of the present invention provides a method of manufacturing a head suspension by bringing a tongue, which is used to attach a slider, of a flexure in contact with a convex portion of a load beam and by laser-welding the flexure to the load beam at a first welding spot so that the tongue is pressed against the projection under predetermined load. The method includes steps of forming, before joining the flexure and load beam together, at least one positioning reference hole in each of the flexure and load beam within a circular range that is defined around the first welding spot as a center thereof with a radius equal to a distance between the first welding spot and the convex portion, laying the flexure and load beam one on another, inserting reference pins into the reference holes, and laser-welding the flexure and load beam to each other at the first welding spot while positioning the flexure and load beam with respect to each other with the use of the reference holes and reference pins.

This aspect of the present invention positions the flexure and load beam with respect to each other based on the first welding spot that is an essential location in positioning the tongue and the convex portion, thereby advancing an alignment correctness between the flexure and the load beam.

Another aspect of the present invention provides a reference pin block used for the method of the above-mentioned aspect, including a single block and the reference pins cut out of a single block material so as to be integrated with and protrude front the single block.

This aspect of the present invention suppresses position errors of the reference pins, to advance the alignment correctness between the flexure and the load beam.

BRIEF DESCRIPTION OF THE DRAWINGS

FIG. 13 is a table listing positioning accuracies according to a related art and the present invention.

DETAILED DESCRIPTION OF EMBODIMENTS

Embodiments of the present invention will be explained. Each embodiment forms reference holes in a flexure and load beam of a head suspension relative to a first welding spot as a reference point and inserts reference pins into the reference holes. thereby advancing an alignment correctness between the flexure and the load beam.

A first embodiment of the present invention will be explained in detail with reference to the drawings.

Figure 1:
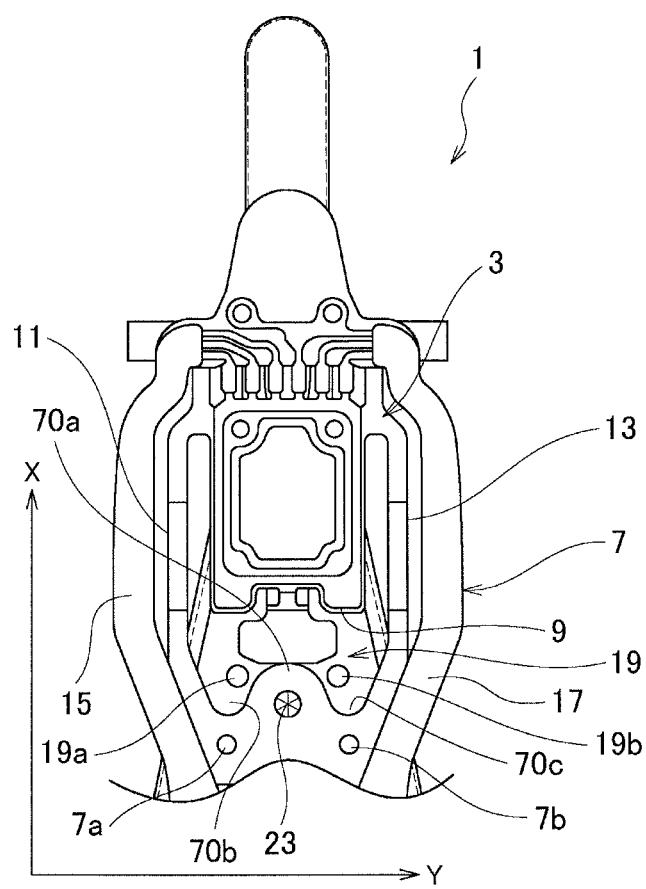
FIG. 1 is a plan view partly illustrating a head suspension manufactured according to a first embodiment of the present invention.
Figure 2:
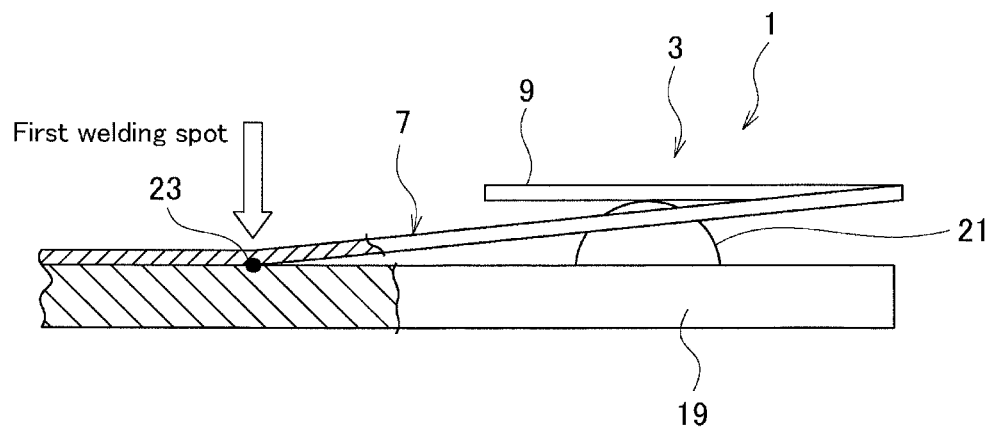
FIG. 2 is a side view illustrating part of the head suspension of FIG. 1.
Figure 3:
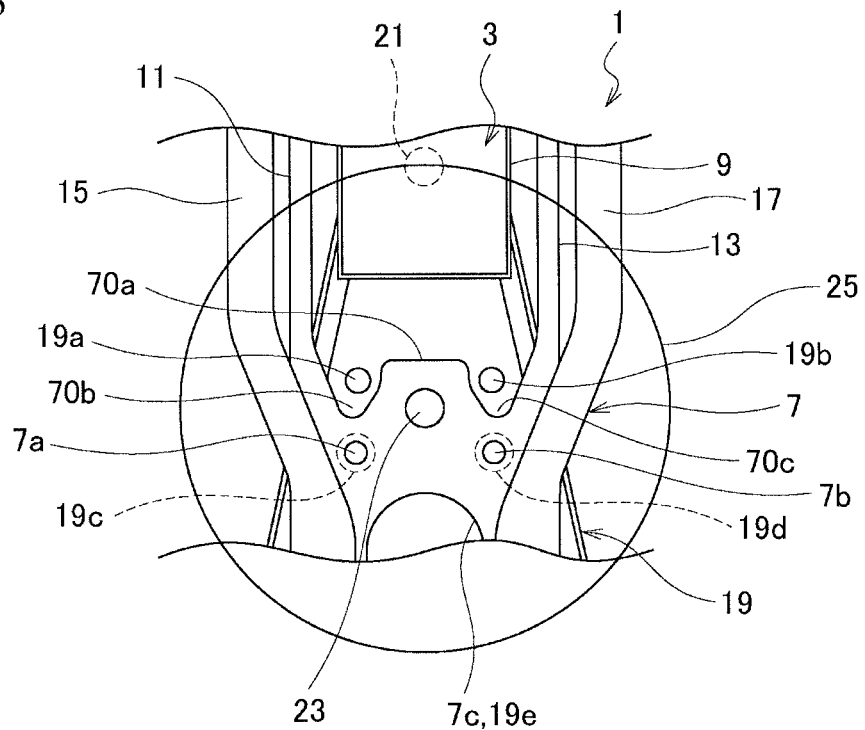
FIG. 3 is a plan view illustrating a relationship between a first welding spot and reference holes of the head suspension of FIG. 1.
Figure 4:
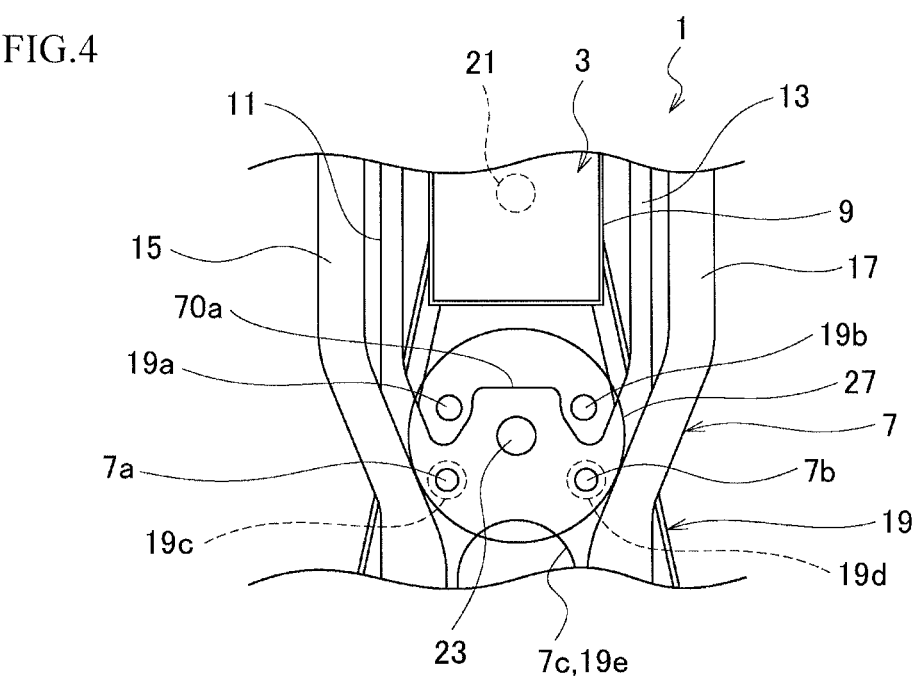
FIG. 4 is a plan view illustrating another relationship between the first welding spot and reference holes of the head suspension of FIG. 1.

FIG. 1 is a plan view partly illustrating a head suspension manufactured according to the first embodiment of the present invention, FIG. 2 is a side view illustrating part of the head suspension of FIG. 1, FIG. 3 is a plan view illustrating a relationship between a first welding spot and reference holes of the head suspension of FIG. 1, and FIG. 4 is a plan view illustrating another relationship between the first welding spot and reference holes of the head suspension of FIG. 1.

In FIGS. 1 and 2, the head suspension 1 has a head portion 3 on which a slider mounted in a later process. That is, the head suspension 1 includes a flexure 7 and the flexure 7 has a tongue 9 to which a slider is attached for the head portion 3. The slider has write and read elements that are electrically connected to wiring 15 and 17 arranged along outriggers 11 and 13 of the flexure 7.

The head suspension 1 also has a load beam 19 that is provided with a dimple 21 as a convex portion. The dimple 21 is in contact with the tongue 9 of the flexure 7. The flexure 7 is laser-welded to the load beam 19 at the first welding spot 23, so that the tongue 9 is pressed against the dimple 21 under predetermined load.

The first welding spot 23 is present on a projection 70a in a planar direction of the flexure 7. On each side of the projection 70a, recesses 70b and 70c are present in the planar direction.

The flexure 7 and load beam 19 each have at least one reference hole for alignment. According to the first embodiment, the flexure 7 has two reference holes 7a and 7b and the load beam 19 has two reference holes 19a and 19b. Corresponding to the reference holes 7a and 7b of the flexure 7, the load beam 19 has enlarged holes 19c and 19d that are concentric with the reference holes 7a and 7b and have a larger diameter than the reference holes 7a and 7b.

The reference holes 7a, 7b, 19a, and 19b are formed within a circular range 25 defined around the first welding spot 23 in FIG. 3. According to the first embodiment, these reference holes are formed within a circular range 27 in FIG. 4 that is narrower than the circular range 25.

The circular range 25 has a radius equal to a distance between the first welding spot 23 and the dimple 21 and indicates a maximum range within which the reference holes must be formed. The circular range 27 has a radius equal to a shortest distance between the first welding spot 23 and the wiring 15 and 17.

The reference holes 7a, 7b, 19a, and 19b are separated on each side with respect to the first welding spot 23 in a widthwise direction, i.e., a left-right Y-direction (FIG. 1) of the head suspension 1. The reference holes 7a and 19a are on the left side and the reference holes 7b and 19b are on the right side. In a front-rear direction, i.e., in an X-direction (FIG. 1), the reference holes 7a and 7b are on the rear side with respect to the first welding spot 23 and the reference holes 19a and 19b are on the front side with respect thereto, to quadrilaterally surround the first welding spot 23.

The reference holes 7a and 7b are positioned behind the recesses 70b and 70c and the reference holes 19a and 19b are positioned in the recesses 70b and 70c.

A segment laterally extending between the reference holes 7a and 7b and a segment laterally extending between the reference holes 19a and 19b are orthogonal to a straight line passing the centers of the first welding spot 23 and the dimple 21. The segment extending between the reference holes 7a and 7b is outside an interval between the first welding spot 23 and the dimple 21 and the segment extending between the reference holes 19a and 19b is within the interval between the first welding spot 23 and the dimple 21.

The flexure 7 and load beam 19 have other holes such as rough alignment holes 7c and 19e.

The flexure 7 is laser-welded to the load beam 19 not only at the first welding spot 23 but also at other welding spots.

Figure 5:
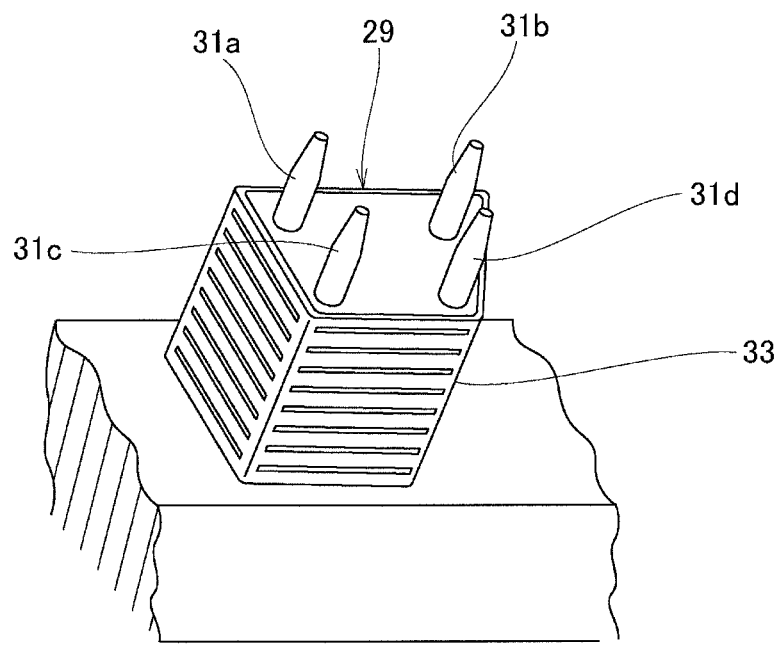
FIG. 5 is a plan view illustrating a reference pin block according to the first embodiment of the present invention.
Figure 6:
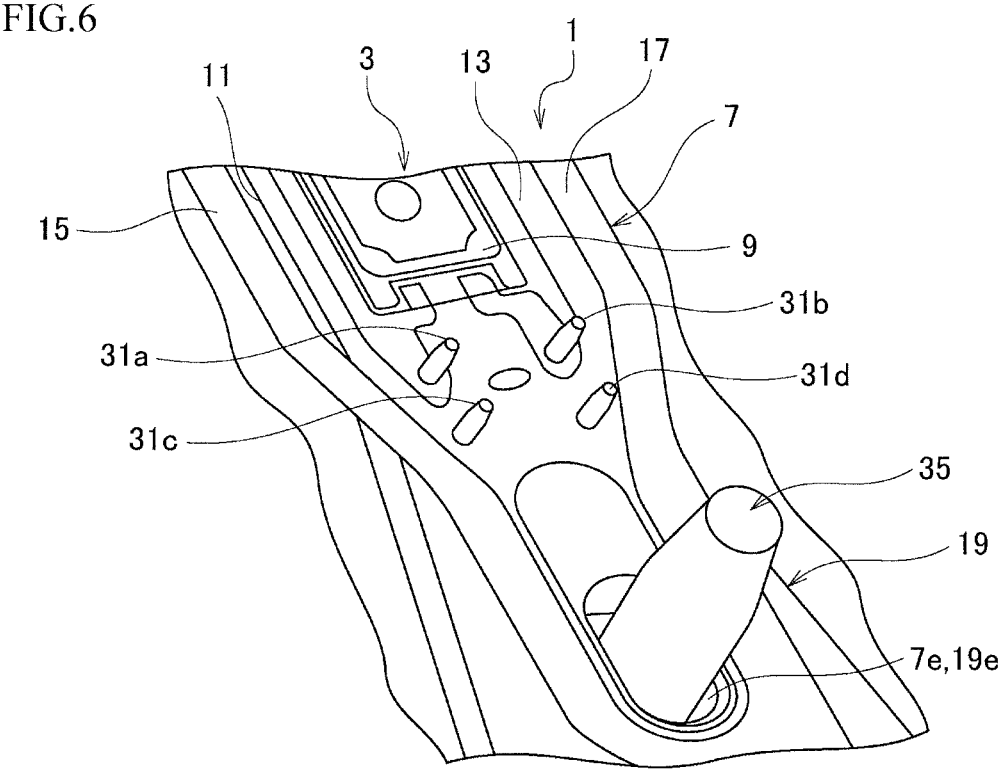
FIG. 6 is a perspective view illustrating a relationship between reference pins and reference holes according to the first embodiment of the present invention.

A method of manufacturing the head suspension 1 will be explained with reference to FIGS. 5 and 6 in which FIG. 5 is a plan view illustrating a reference pin block and FIG. 6 is a perspective view illustrating a relationship between reference pins and the reference holes.

The reference pin block 29 of FIG. 5 is used when manufacturing the head suspension 1. The reference pin block 29 has four reference pins 31a, 31b, 31c, and 31d that correspond to the reference holes 7a, 7b, 19a, and 19b of the flexure 7 and load beam 19. The reference pins are cut out of a single material block material, and therefore, are integral with and protrude from the single material block 33.

More precisely, the reference pins 31a, 31b, 31c, and 31d are machined from the material block by, for example, a numerical control machine tool each into a shape tapered toward a front end and having a base diameter of 0.2 mm or smaller, preferably about 0.13 mm. A distance between the reference pins 31a and 31b is about 0.68 mm. The diameters and intervals of the reference pins are properly determined according to the size of the head suspension 1 and the sizes of the reference holes 7a, 7b, 19a, and 19b.

Before joining the flexure 7 and load beam 19 together by laser welding, the reference holes 7a and 7b are formed in the flexure 7 and the reference holes 19a and 19b and enlarged holes 19c and 19d in the load beam 19 within the circular range 27 according to the embodiment. At this time, other holes such as the rough alignment holes 7c and 19e are also formed in the flexure 7 and load beam 19.

The flexure 7 and load beam 19 before joining are laid one on another and the reference holes 7a, 7b, 19a, and 19b are positioned around the first welding spot 23. The reference pins 31a, 31b, 31c, and 31d are inserted into the reference holes 7a, 7b, 19a, and 19b, respectively.

At this time, the enlarged holes 19c and 19d having a larger diameter than the reference holes 7a and 7b function to correctly position the reference holes 7a and 7b with the reference pins 31c and 31d without an interference of the enlarged holes 19c and 19d.

Before aligning the flexure 7 and load beam 19 with each other with the use of the reference pins 31a, 31b, 31c, and 31d, a rough alignment pin 35 is inserted into the rough alignment holes 7c and 19e.

The flexure 7 and load beam 19 are correctly positioned with respect to each other with the use of the reference pins 31a, 31b, 31c, and 31d and reference holes 7a, 7b, 19a, and 19b around the first welding spot 23. In this state, laser welding is carried out at the first welding spot 23.

Thereafter, laser welding is carried out at other spots, to join the flexure 7 and load beam 19 to each other with the tongue 9 being correctly positioned with respect to the dimple 21 and being pressed against the dimple 21 under predetermined load.

The above-mentioned positioning and joining of the flexure 7 and load beam 19 are achievable not only when the flexure 7 and load beam 19 are separated as discrete members but also when they are chained with other flexures and load beams in respective frames.

It is possible to employ image processing to determine locations of welding spots according to the reference pins or reference holes around the first welding spot 23. This improves the positioning accuracy of the flexure 7, load beam 19, and laser welding spots, thereby stabilizing the mechanical characteristics, in particular, vibration characteristics of front part beyond the first welding spot 23 of the head suspension 1.

Modified embodiments of the first embodiment according to the present invention will be explained with reference to FIGS. 7 to 12.

Figure 7:
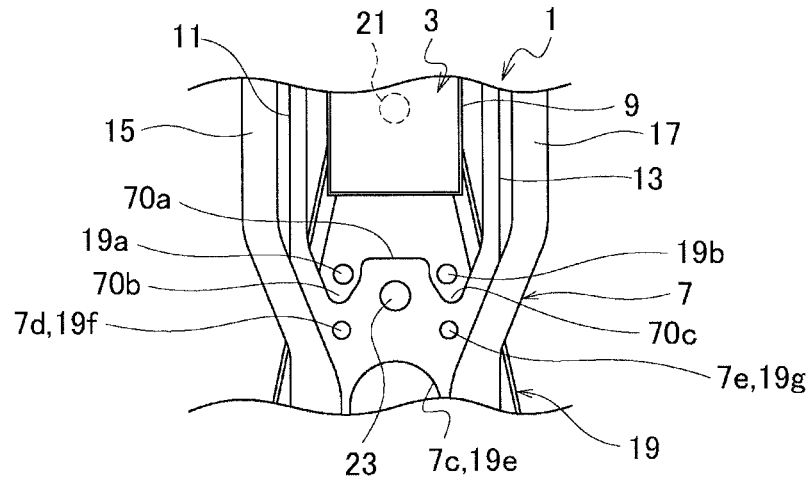
FIG. 7 is a plan view illustrating a relationship between a first welding spot and reference holes of a head suspension manufactured according to a first modified embodiment of the first embodiment of the present invention.

FIG. 7 illustrates a relationship between a first welding spot and reference holes of a head suspension 1 manufactured according to the first modified embodiment. The first modified embodiment forms two reference holes 7d and 7e in a flexure 7 and two reference holes 19f and 19g in a load beam 19. The reference holes 7d, 7e, 19f, and 19g have the same diameter and are arranged on opposite sides of a first welding spot 23 at positions offset from the first welding spot 23 and behind recesses 70b and 70c. The reference holes 7d and 19f forming a pair are concentric with each other and the reference holes 7e and 19g forming a pair are concentric with each other.

A segment extending between the reference holes 7d (19f) and 7e (19g) is orthogonal to a straight line passing the centers of the first welding spot 23 and dimple 21. The reference holes 7d, 7e, 19f, and 19g are shifted out of an interval between the first welding spot 23 and the dimple 21 toward a rear side (base side) of the head suspension 1.

A reference pin block according to the first modified embodiment has two reference pins protruding from a single block.

Before joining the flexure 7 and load beam 19 together, the reference holes 7d, 7e, 19f, and 19g are formed within a circular area 27 (FIG. 4) of the flexure 7 and load beam 19.

The flexure 7 and load beam 19 before joining are laid one on another so that the reference holes 7d and 7e may overlap the reference holes 19f and 19g. Into the reference hole pair 7d and 19f and reference hole pair 7e and 19g, the reference pins of the reference pin block are inserted, respectively.

The remaining part of the first modified embodiment is the same as the first embodiment.

Figure 8:
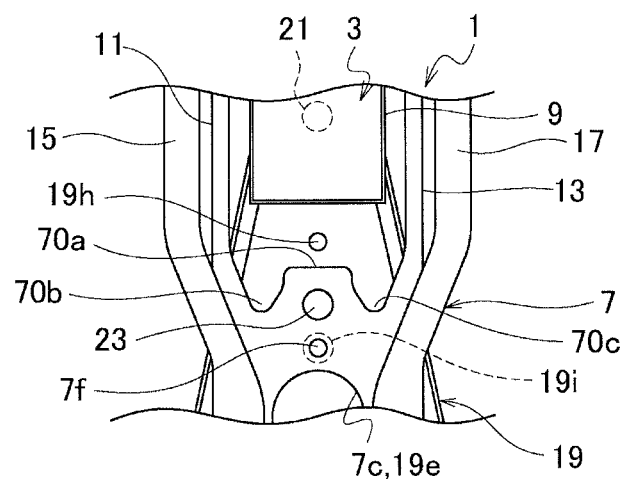
FIG. 8 is a plan view illustrating a relationship between a first welding spot and reference holes of a head suspension manufactured according to a second modified embodiment of the first embodiment of the present invention.

FIG. 8 illustrates a relationship between a first welding spot and reference holes of a head suspension 1 manufactured according to the second modified embodiment. The second modified embodiment forms one reference hole 7f in a flexure 7 and one reference hole 19b in a load beam 19. The reference holes 7f and 19h are disposed on respective sides in the front-rear direction, i.e., the direction X of FIG. 1 to interpose a first welding spot 23 therebetween. The load beam 19 is provided with an enlarged hole 19i that is concentric with the reference hole 7f of the flexure 7.

The reference hole 7f is out of an interval between the first welding spot 23 and a dimple 21 and is on the rear side of the first welding spot 23. The reference hole 19h is in front of the first welding spot 23, between the first welding spot 23 and the dimple 21 and in the vicinity of a projection 70a of the flexure 7.

The reference holes 7f and 19h are arranged on a straight line passing the first welding spot 23 and the dimple 21. The reference hole 7f is out of the interval between the first welding spot 23 and the dimple 21 and is on the rear side (base side) of the head suspension 1 on the straight line. The reference hole 19h is arranged between the first welding spot 23 and the dimple 21 on the straight line in the vicinity of the projection 70a of the flexure 7.

A reference pin block according to the second modified embodiment is similar to that of the first modified embodiment.

Before joining the flexure 7 and load beam 19 together, the reference holes 7f and 19h and enlarged hole 19i are formed within a circular range 27 (FIG. 4) of the flexure 7 and load beam 19.

The flexure 7 and load beam 19 before joining are laid one on another and the reference pins of the reference pin block are inserted into the reference holes 7f and 19h.

The remaining part of the second modified embodiment is the same as the first embodiment.

Figure 9:
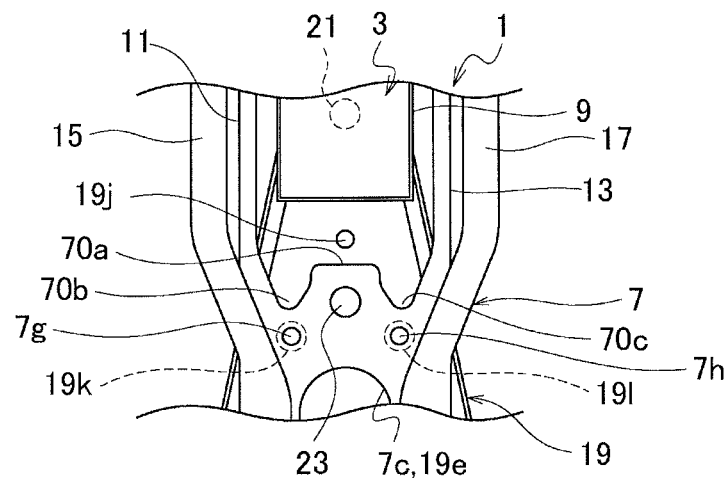
FIG. 9 is a plan view illustrating a relationship between a first welding spot and reference holes of a head suspension manufactured according to a third modified embodiment of the first embodiment of the present invention.

FIG. 9 illustrates a relationship between a first welding spot and reference holes of a head suspension 1 manufactured according to the third modified embodiment. The third modified embodiment forms two reference holes 7g and 7h in a flexure 7 and one reference hole 19j in a load beam 19. The reference holes 7g, 7h, and 19j surround a first welding spot 23 in a regular triangle shape. The load beam 19 is provided with enlarged holes 19k and 19l that are concentric with the reference holes 7g and 7h of the flexure 7.

The reference holes 7g and 7h are arranged behind recesses 70b and 70c and the reference hole 19j is arranged in the vicinity of a projection 70a of the flexure 7.

A segment extending between the reference holes 7g and 7h is out of an interval between the first welding spot 23 and a dimple 21 and is orthogonal to a straight line passing the centers of the first welding spot 23 and dimple 21. The reference hole 19j is arranged between the first welding spot 23 and the dimple 21 on the straight line passing the centers of the first welding spot 23 and dimple 21.

A reference pin block according to the third modified embodiment has three reference pins arranged in a regular triangle shape and protruding from a single block.

Before joining the flexure 7 and load beam 19 together, the reference holes 7g, 7h, and 19j and enlarged holes 19k and 19l are formed within a circular range 27 (FIG. 4) of the flexure 7 and load beam 19.

The flexure 7 and load beam 19 before joining are laid one on another and the reference pins are inserted into the reference holes 7g, 7h, and 19j.

The remaining part of the third modified embodiment is the same as the first embodiment.

Figure 10:
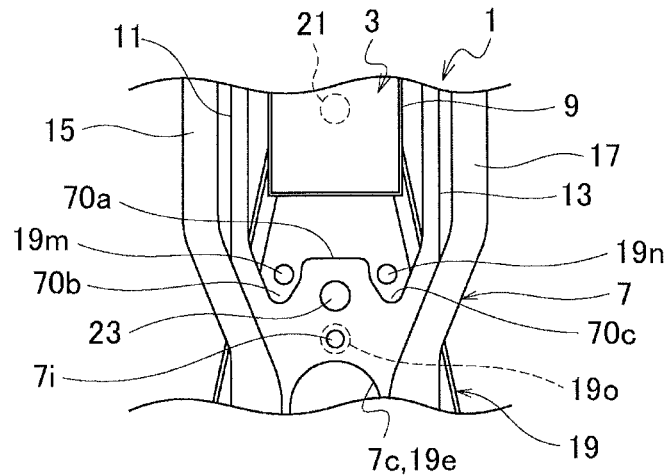
FIG. 10 is a plan view illustrating a relationship between a first welding spot and reference holes of a head suspension manufactured according to a fourth modified embodiment of the first embodiment of the present invention.

FIG. 10 illustrates a relationship between a first welding spot and reference holes of a head suspension 1 manufactured according to the fourth modified embodiment. The fourth modified embodiment forms one reference hole 7i in a flexure 7 and two reference holes 19m and 19n in a load beam 19. The reference holes 7i, 19m, and 19n surround a first welding spot 23 in an isosceles triangle shape. The load beam 19 is provided with an enlarged hole 19o that is concentric with the reference hole 7i of the flexure 7.

The reference hole 7i is arranged behind the first welding spot 23 and the reference holes 19m and 19n are arranged in recesses 70b and 70c, respectively.

The reference hole 7i is on a straight line passing the centers of the first welding spot 23 and a dimple 21 and is outside an interval between the first welding spot 23 and the dimple 21. A segment extending between the reference holes 19m and 19n orthogonal to the straight line passing the centers of the first welding spot 23 and dimple 21.

A reference pin block according to the fourth modified embodiment has three reference pins arranged in a triangle shape and protruding from a single block.

Before joining the flexure 7 and load beam 19 together, reference holes 7i, 19m, and 19n and enlarged hole 19o are formed within a circular range 27 (FIG. 4) of the flexure 7 and load beam 19.

The flexure 7 and load beam 19 before joining are laid one on another and the reference pins are inserted into the reference holes 7i, 19m, and 19n.

The remaining part of the fourth modified embodiment is the same as the first embodiment.

Figure 11:
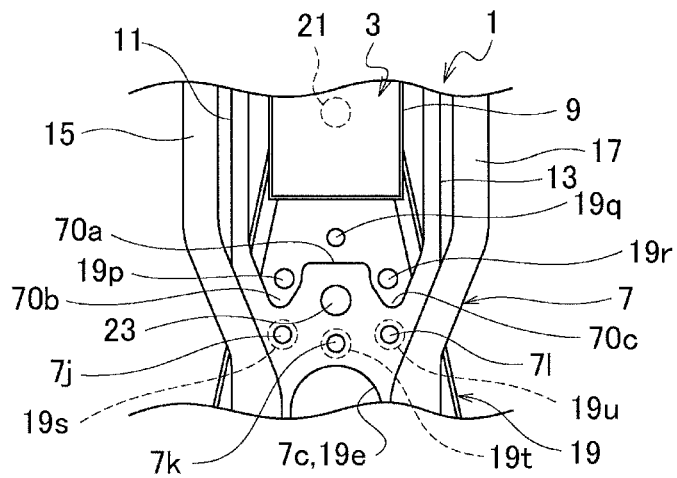
FIG. 11 is a plan view illustrating a relationship between a first welding spot and reference holes of a head suspension manufactured according to a fifth modified embodiment of the first embodiment of the present invention.

FIG. 11 illustrates a relationship between a first welding spot and reference holes of a head suspension 1 manufactured according to the fifth modified embodiment. The fifth modified embodiment forms three reference holes 7j, 7k, and 7l in a flexure 7 and three reference holes 19p, 19q, and 19r in a load beam 19, so that these six reference holes surround a first welding spot 23 in a hexagonal shape. The load beam 19 is provided with enlarged holes 19s, 19t, and 19u that are concentric with the reference holes 7j, 7k, and 7l of the flexure 7, respectively.

The reference hole 7k is outside an interval between the first welding spot 23 and a dimple 21 and behind the first welding spot 23. The reference holes 7j and 7l are arranged behind recesses 70b and 70c. The reference hole 19q is arranged between the first welding spot 23 and the dimple 21 in the vicinity of a projection 70a. The reference holes 19p and 19r are arranged inside the recesses 70b and 70c.

The reference holes 7k and 19q are arranged on a straight line passing the centers of the first welding spot 23 and dimple 21.

A segment extending between the reference holes 7j and 7l and a segment extending between the reference holes 19p and 19r are orthogonal to the straight line passing the centers of the first welding spot 23 and dimple 21. The segment extending between the reference holes 7j and 7l is outside the interval between the first welding spot 23 and the dimple 21. The segment extending between the reference holes 19p and 19r is between the first welding spot 23 and the dimple 21.

A reference pin block according to the fifth modified embodiment has six reference pins arranged in a hexagonal shape and protruding from a single block.

Before joining the flexure 7 and load beam 19 together, the reference holes 7j, 7k, 7l, 19p, 19q, and 19r and enlarged holes 19s, 19t, and 19u are formed within a circular range 27 (FIG. 4) of the flexure 7 and load beam 19.

The flexure 7 and load beam 19 before joining are laid one on another and the reference pins are inserted into the reference holes 7j, 7k, 7l, 19p, 19q, and 19r.

The remaining part of the fifth modified embodiment is the same as the first embodiment.

Figure 12:
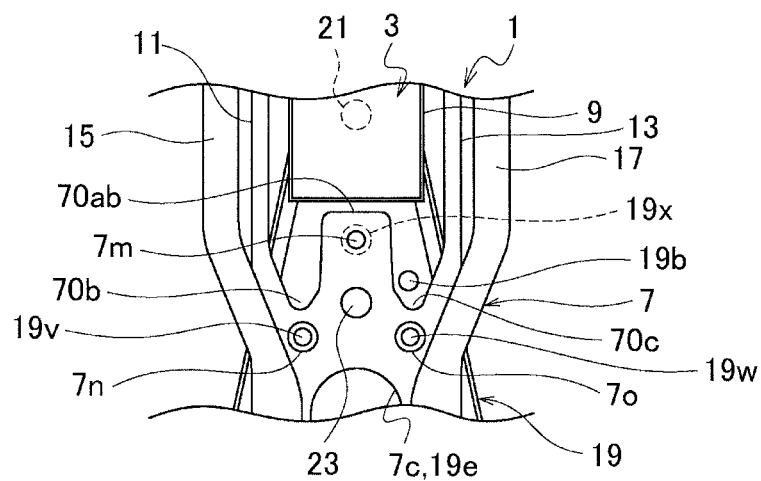
FIG. 12 is a plan view illustrating a relationship between a first welding spot and reference holes of a head suspension manufactured according to a sixth modified embodiment of the first embodiment of the present invention.

FIG. 12 illustrates a relationship between a first welding spot and reference holes of a head suspension 1 manufactured according to the sixth modified embodiment. The sixth modified embodiment forms one reference hole 7m in a flexure 7 and two reference holes 19v and 19w in a load beam 19, so that these three reference holes surround a first welding spot 23 in a regular triangle shape. The load beam 19 is provided with an enlarged hole 19x that is concentric with the reference hole 7m of the flexure 7. The flexure 7 is provided with enlarged holes 7n and 7o that are concentric with the respective reference holes 19v and 19w of the load beam 19.

The reference holes 19v and 19w are arranged behind recesses 70b and 70c. The reference hole 7m is arranged on an extended projection 70ab of the flexure 7.

A segment extending between the reference holes 19v and 19w is outside an interval between the first welding spot 23 and a dimple 21 and is orthogonal to a straight line passing the centers of the first welding spot 23 and dimple 21. The reference hole 7m is on the straight line passing the centers of the first welding spot 23 and dimple 21 and is present between the first welding spot 23 and the dimple 21.

A reference pin block according to the sixth modified embodiment has three reference pins arranged in a regular triangle shape and protruding from a single block.

Before joining the flexure 7 and load beam 19 together, the reference holes 7m, 19v, and 19w and enlarged holes 19x, 7n, and 7o are formed within a circular range 27 (FIG. 4) of the flexure 7 and load beam 19.

The flexure 7 and load beam 19 before joining are laid one on another and the reference pins are inserted into the reference holes 7m, 19v, and 19w.

The remaining part of the sixth modified embodiment is the same as the first embodiment.

Effects of the present invention will be explained.

The method according to the present invention manufactures the head suspension 1 by bringing the tongue 9, which is used to attach a slider, of the flexure 7 in contact with the dimple 21 of the load beam 19 and by laser-welding the flexure 7 to the load beam 19 at the first welding spot 23 so that the tongue 9 is pressed against the dimple 21 under predetermined load. The method includes steps of forming, before joining the flexure 7 and load beam 19 to each other, at least one positioning reference hole in each of the flexure 7 and load beam 19, for example, two reference holes 7a and 7b in the flexure 7 and two reference holes 19a and 19b in the load beam 19 within the circular range 25 (FIG. 3) that is defined around the first welding spot 23 with a radius equal to a distance between the first welding spot 23 and the dimple 21, laying the flexure 7 and load beam 19 one on another, inserting the reference pins 31a, 31b, 31c, and 31d into the reference holes 7a, 7b, 19a, and 19b, and laser-welding the flexure 7 and load beam 19 to each other at the first welding spot 23 while positioning the flexure 7 and load beam 19 with respect to each other with the use of the reference holes and reference pins.

The first welding spot 23 at which the flexure 7 and load beam 19 are laser-welded to each other is most important or essential to correctly position the tongue 9 and dimple 21 with respect to each other. Since the present invention aligns the tongue 9 and dimple 21 with each other according to the first welding spot 23 as the reference point, the present invention advances an alignment correctness or positioning preciseness between the flexure 7 and the load beam 19.

The present invention forms the reference holes 7a, 7b, 19a, and 19b based on the first welding spot 23, to minimize distances among the reference holes 7a, 7b, 19a, and 19b. Even if the flexure 7 is thin and has a low rigidity, the flexure 7 is correctly positioned with respect to the load beam 19 with the use of the reference holes 7a, 7b, 19a, and 19b and reference pins 31a, 31b, 31c, and 31d.

FIG. 13 is a table listing positioning accuracies according to the related art disclosed in JP2002-133808A and the present invention. "Two pins" in FIG. 13 is based on one of the second and third modified embodiments of FIGS. 7 and 8 and "Four pins" is based on the first embodiment of FIG. 4. In FIG. 13, "σ (RY, RX)" represents variations in Y-direction (RY) and X-direction (RX). The Y- and X-directions are as illustrated in FIG. 1. Compared with the related art, the two-pin configuration of the present invention involves smaller variations and the four-pin configuration of the present invention demonstrates further smaller variations.

With the two reference holes 19a and 19b, the load beam 19 is positioned with respect to the reference pins 31a and 31b, and with the two reference holes 7a and 7b, the flexure 7 is positioned with respect to the reference pins 31c and 31d. As a result, the flexure 7 having a low rigidity is correctly positioned with respect to the load beam 19.

The reference holes 7a, 7b, 19a, and 19b may be formed within the circular range 27 (FIG. 4) that is defined around the first welding spot 23 with a radius equal to a minimum distance between the first welding spot 23 and the wiring 15 and 17.

In this case, the reference holes 7a, 7b, 19a, and 19b are correctly arranged based on the first welding spot 23.

According to the first modified embodiment illustrated in FIG. 7, the reference holes 7d and 7e are formed in the flexure 7 and the reference holes 19f and 19g in the load beam 19. The reference holes 7d, 7e, 19f and 19g have the same diameter and are arranged on opposite sides of the first welding spot 23 at positions offset from the first welding spot 23. The reference holes 7d and 19f forming a pair are concentric with each other and the reference holes 7e and 19g forming a pair are concentric with each other.

This configuration improves a widthwise positioning accuracy of the flexure 7 and load beam 19.

If there is a relatively large hole between the dimple 21 and the first welding spot 23, there will be no space to form reference holes at different positions of the flexure 7 and load beam 19. In this case, forming reference holes at the same positions of the flexure 7 and load beam 19 according to the first modified embodiment is effective due to reduction in the number of reference holes or the like.

With the two reference holes 19f and 19g, the load beam 19 is positioned with respect to the reference pins, and with the two reference holes 7d and 7e, the flexure 7 is positioned with respect to the reference pins. As a result, the flexure 7 having a low rigidity is correctly positioned with respect to the load beam 19.

According to the second modified embodiment illustrated in FIG. 8, the one reference hole 7f is formed in the flexure 7 and the one reference hole 19h in the load beam 19. The reference holes 7f and 19h are disposed on respective sides in the front-rear direction, i.e., front-rear X direction of FIG. 1 to interpose the first welding spot therebetween. The load beam 19 is provided with the enlarged hole 19i that is concentric with the reference hole 7f of the flexure 7.

This configuration improves a front-rear positioning accuracy and is effective when no space is available to arrange two reference holes in a width direction.

According to the third modified embodiment illustrated in FIG. 9, the two reference holes 7g and 7h are formed in the flexure 7 and the reference hole 19j in the load beam 19. The reference holes 7g, 7h, and 19j surround the first welding spot 23 in a regular triangle shape. The load beam 19 is provided with the enlarged holes 19k and 19l that are concentric with the reference holes 7g and 7h of the flexure 7.

This configuration improves positioning accuracy in both the width and front-rear directions of the head suspension 1 and is effective when no space is available to widthwise arrange two reference holes on the front side of the first welding spot 23.

According to the fourth modified embodiment illustrated in FIG. 10, the reference hole 7i is formed in the flexure 7 and the two reference holes 19m and 19n in the load beam 19. The reference holes 7i, 19m, and 19n surround the first welding spot 23 in an isosceles triangle shape. The load beam 19 is provided with the enlarged hole 19o that is concentric with the reference hole 7i of the flexure 7.

This configuration improves positioning accuracy in both the width and front-rear directions of the head suspension 1 and is effective when no space is available to widthwise arrange two reference holes on the rear side of the first welding spot 23.

According to the fifth modified embodiment illustrated in FIG. 11, the three reference holes 7j, 7k, and 7l are formed in the flexure 7 and the three reference holes 19p, 19q, and 19r in the load beam 19, so that these six reference holes surround the first welding spot 23 in a hexagonal shape. The load beam 19 is provided with the enlarged holes 19s, 19t, and 19u that are concentric with the reference holes 7j, 7k, and 7l of the flexure 7.

This configuration further improves positioning accuracy in both the width and front-rear directions of the head suspension 1 and is effective to realize precise positioning when a sufficient space is available to arrange the reference holes.

According to the sixth modified embodiment illustrated in FIG. 12, the one reference hole 7m is formed in the flexure 7 and the two reference holes 19v and 19w in the load beam 19, so that, these three reference holes surround the first welding spot 23 in a regular triangle shape. The load beam 19 is provided with the enlarged hole 19x that is concentric with the reference hole 7m of the flexure 7. The flexure 7 is provided with the enlarged holes 7n and 7o that are concentric with the reference holes 19v and 19w of the load beam 19.

This configuration improves positioning accuracy in both the width and front-rear directions of the head suspension 1. A front end part of the load beam 19 is usually provided with a hole to control the rigidity of the load beam 19. If this hole is not circular, the hole is not usable as a positioning reference hole. In this case, the sixth modified embodiment is effective to position the flexure 7 at the front end part of the load beam 19.

Corresponding to the reference holes 19v and 19w of the load beam 19 and the reference holes 7f, 7g, 7h, 7i, 7j, 7k, 7l, and 7m of the flexure 7, the enlarged holes 7n and 7o of the flexure 7 and the enlarged holes 19i, 19k, 19l, 19o, 19s, 19t, 19u, and 19x of the load beam 19 are formed to have larger diameters than the reference holes.

With this, the reference pins are correctly inserted into the reference holes without interfering with the enlarged holes.

The reference pin block 29 has the reference pins 31a, 31b, 31c and 31d that are integral with the reference pin block 29.

With this, the reference pins correctly maintain positional relationships among them, to surely position the reference holes.

The reference pins 31a, 31b, 31c, and 31d are machined from a single material block by, for example, a numerical control machine tool each into a shape tapered toward a front end and having a base diameter of 0.2 mm or smaller, preferably about 0.13 mm. A distance between the reference pins 31a and 31b is about 0.68 mm.

This configuration minimizes a clearance between each reference pin and a corresponding reference hole and improves a positioning accuracy.

What is claimed is:
1. A method of manufacturing a head suspension by bringing a tongue, which is used to attach a slider, of a flexure in contact with a convex portion of a load beam and by laser-welding the flexure to the load beam at a first welding spot so that the tongue is pressed against the convex portion under predetermined load, the method comprising steps of:
before joining the flexure and load beam together, forming at least one positioning reference hole in each of the flexure and load beam within a circular range that is defined around the first welding spot as a center thereof with a radius equal to a distance between the first welding spot and the convex portion, the positioning reference hole formed in the flexure and the positioning reference hole formed in the load beam having different positions relative to the first welding spot so as to be apart from each other in a planar direction of the flexure and the load beam;

laying the flexure and load beam one on another and inserting reference pins that keep a given distance in the planar direction according to said positions of the positioning reference holes in the flexure and the load beam into the reference holes in the flexure and the load beam, respectively; and laser-welding the flexure and load beam to each other at the first welding spot while positioning the flexure and load beam with respect to each other with the use of the reference holes and reference pins.

2. The method of claim 1, wherein the circular range is defined around the first welding spot with a radius equal to a minimum distance between the first welding spot and wiring of the flexure.

3. The method of claim 1, wherein the positioning reference hole formed in the flexure and the positioning reference hole formed in the load beam are formed on each side of the first welding spot so that two positioning reference holes interpose the first welding spot.

4. The method of claim 1, wherein the positioning reference hole formed in the flexure is formed at a total of three or more locations and the positioning reference hole formed in the load beam is formed at a total of three or more locations, so that the positioning reference holes in the flexure and in the load beam surround the first welding spot in a form of one of a triangle, quadrilateral, and hexagon.

5. The method of claim 1, wherein a second hole larger than and concentric with the positioning reference hole formed in one of the flexure and load beam is formed in the other of the flexure and load beam.

6. The method of claim 5, wherein a first reference pin of said reference pins passes through said second hole and said reference hole formed in said one of the flexure and load beam concentric to said second hole, and wherein a second reference pin of said reference pins passes through said reference hole in said other of the flexure and the load beam, and wherein said one of the flexure and load beam does not have a hole, concentric to said reference hole in said other of the flexure and the load beam that receives said second reference pin, for aligning said flexure and said load beam.

7. The method of claim 1, wherein the reference pins have an integrated common base.

8. The method of claim 1, wherein the reference hole is formed on each side of the first welding spot so that two reference holes offset from the first welding spot.

9. A method of manufacturing a head suspension by bringing a tongue, which is used to attach a slider, of a flexure in contact with a convex portion of a load beam and by laser-welding the flexure to the load beam at a first welding spot so that the tongue is pressed against the convex portion under predetermined load, the method comprising steps of:

before joining the flexure and load beam together, forming a first positioning reference hole the flexure;

before joining the flexure and load beam together, forming a second positioning reference hole the load beam, wherein the first positioning reference hole and the second positioning reference hole are respectively positioned so as to be offset by a given distance from each other in a planar direction of the head suspension, wherein said given distance is within a circular range that is defined around the first welding spot as a center thereof with a radius equal to a distance between the first welding spot and the convex portion;

laying the flexure and load beam one on another;

inserting a first reference pin through the first positioning reference hole and inserting a second reference pin through the second positioning reference hole, whereby said given distance in the planar direction is maintained between said first positioning reference hole in the flexure and said second positioning reference hole in the load beam; and laser-welding the flexure and load beam to each other at the first welding spot while said first reference pin and said second reference pin are inserted.

10. The method of claim 9, wherein said inserting a first reference pin comprises inserting said first reference pin through the first positioning reference hole in said flexure and a concentrically aligned third reference hole in said load beam, said aligned third reference hole having a larger diameter than the first positioning reference hole; and wherein said inserting said second reference pin comprises inserting said second reference pin through the second positioning reference hole in said load beam, and said flexure does not have a corresponding hole, in concentric alignment with said second positioning reference hole of said load beam, for aligning said flexure and said load beam.

11. The method of claim 9, wherein said inserting a second reference pin comprises inserting said second reference pin through the second positioning reference hole in said load beam and a concentrically aligned third reference hole in said flexure, said aligned third reference hole having a larger diameter than the second positioning reference hole; and and wherein said inserting said first reference pin comprises inserting said first reference pin through the first positioning reference hole in said flexure, and said load beam does not have a corresponding hole, in concentric alignment with said first positioning reference hole of said flexure, for aligning said flexure and said load beam.

* * * * *